(12) United States Patent
Brady et al.

(10) Patent No.: US 6,770,425 B2
(45) Date of Patent: Aug. 3, 2004

(54) SELF-ALIGNED APERTURE MASKS HAVING HIGH DEFINITION APERTURES

(75) Inventors: Michael D. Brady, Painted Post, NY (US); Céline C. Guermeur, Chartrettes (FR); Yann P. M. Nédeléc, Avon (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/430,179

(22) Filed: Apr. 15, 2003

(65) Prior Publication Data

US 2003/0202244 A1 Oct. 30, 2003

Related U.S. Application Data

(63) Continuation of application No. 10/072,457, filed on Feb. 7, 2002, now abandoned.
(60) Provisional application No. 60/267,037, filed on Feb. 7, 2001.

(51) Int. Cl.[7] .............................................. G03B 21/60
(52) U.S. Cl. ..................................... 430/321; 359/456
(58) Field of Search .......................... 430/321; 359/454, 359/455, 456, 460

(56) References Cited

U.S. PATENT DOCUMENTS

| | | |
|---|---|---|
| 1,942,841 A | 1/1934 | Shimizu |
| 2,338,654 A | 4/1942 | MacNeille |
| 2,362,573 A | 1/1944 | MacNeille |
| 2,358,070 A | 9/1944 | Holmes et al. |
| 2,618,198 A | 11/1952 | Luboshez |
| 3,832,032 A | 8/1974 | Shimada |
| 4,172,219 A | 10/1979 | Deml et al. |
| 4,260,673 A | 4/1981 | Krech |
| 4,486,363 A | 12/1984 | Pricone et al. |
| 4,507,382 A | 3/1985 | Rousseau et al. |
| 4,556,626 A | 12/1985 | Speigel |
| 4,601,861 A | 7/1986 | Pricone et al. |
| 4,666,248 A | 5/1987 | van de Ven |
| 4,882,262 A | 11/1989 | Wilwerding |
| 5,066,099 A | 11/1991 | Yoshida et al. |
| 5,210,641 A | 5/1993 | Lewis |
| 5,264,063 A | 11/1993 | Martin |
| 5,529,878 A | 6/1996 | Menard et al. |
| 5,870,224 A | 2/1999 | Saitoh et al. |
| 5,897,980 A | 4/1999 | Phillips et al. |
| 2001/0015780 A1 | 8/2001 | Yamaguchi |

FOREIGN PATENT DOCUMENTS

| | | |
|---|---|---|
| EP | 0 753 791 A1 | 1/1997 |
| EP | 1 014 169 A1 | 6/2000 |
| EP | 1 074 882 A1 | 2/2001 |
| JP | 09-269546 | 10/1997 |
| JP | 11-101902 | 4/1999 |
| JP | 11-344602 | 12/1999 |
| JP | 2000-035616 | 2/2000 |
| JP | 2000-147662 | 5/2000 |
| JP | 2000-147663 | 5/2000 |
| JP | 2001-074918 | 3/2001 |
| WO | WO 99/36830 | 7/1999 |
| WO | WO 00/67071 | 11/2000 |
| WO | WO 02/10804 | 2/2002 |

OTHER PUBLICATIONS

Imation Enterprises Corp.'s product brochure entitled "Imation™ Matchprint™ Positive Color Proofing Films," 1999.
Translation of Japanese Patent Publication No. 11–101902 (Reference 29 above).

*Primary Examiner*—John A. McPherson
(74) *Attorney, Agent, or Firm*—Maurice M. Klee; Ronald J. Paglierani; Mark W. Lauroesch

(57) ABSTRACT

Self-aligned aperture masks are produced using a positive-acting photoresist (18) which is developed with a liquid developer. The apertures (30) of the mask have lower levels of inter-aperture variability than masks produced using mechanical transfer of toner particles (FIGS. 4–5 and 7–8), both for the apertures of a given mask and between masks.

21 Claims, 6 Drawing Sheets

PRESENT INVENTION

PRESENT INVENTION

PRESENT INVENTION

PRESENT INVENTION

SELF-ALIGNED APERTURE MASKS HAVING HIGH DEFINITION APERTURES

FIELD OF THE INVENTION

This invention relates to self-aligned aperture masks used in rear projection screens and, in particular, to self-aligned masks which achieve high definition of the individual apertures making up the mask.

BACKGROUND OF THE INVENTION

Rear projection televisions are widely used as consumer products and are becoming ever more popular as computer monitors. A critical component of such televisions is the rear projection screen upon which the user views the ultimate image. Such screens need to satisfy a number of stringent criteria.

For example, to provide a bright image, the screen should control the distribution of light in viewer space so that as much light as possible is directed to the places where the user is likely to be. Arrays of either cylindrical lenses or microlenses can be used for this purpose. Co-pending U.S. patent application Ser. No. 60/222,033, filed Jul. 31, 2000, and entitled "Structured Screens for Controlled Spreading of Light," the contents of which are incorporated herein by reference, discloses particularly preferred microlens arrays for this purpose. This application is referred to hereinafter as the "'033 patent application".

To achieve high contrast, rear projection screens have typically included an aperture mask designed to prevent ambient light from entering the projection television. Such light can reflect from structures internal to the television and become redirected to the viewer. This redirected light reduces the contrast of the image since it can appear at, for example, places where the image should be black.

In their most simple form, aperture masks can be prepared by printing a black matrix on one of the surfaces making up the rear projection screen. Beginning with arrays of cylindrical lenses and continuing through to arrays of microlenses, workers in the art have used self-alignment techniques to form such aperture masks. See, for example, U.S. Pat. No. 2,338,654, U.S. Pat. No. 2,618,198, U.S. Pat. No. 5,870,224, PCT Patent Publication No. WO 99/36830, EPO Patent Publication No. 1 014 169 A1, Japanese Patent Publication No. 2000-147662, and Japanese Patent Publication No. 2000-147663.

The goal of these self-alignment techniques is to ensure that the apertures of the mask correspond to the locations where light will be focused by the lens array. In some cases, the apertures are produced first and are subsequently used to produce microlenses (see U.S. Pat. No. 5,897,980, EPO Patent Publication No. 0 753 791, PCT Patent Publication No. WO 99/36830) and in other cases, the lenses are prepared first and then used in the production of the apertures (see U.S. Pat. No. 4,666,248).

The present invention is concerned with the second approach, i.e., the approach in which an array of lenses is produced first and then used to create a self-aligned aperture mask.

The earliest self-aligned aperture masks were based on photographic emulsion technology. This approach has a number of disadvantages including low transparency of the apertures and poor age performance. If a photographic emulsion were to be used to produce an aperture mask for a projection television, the age performance problem would only become worse in view of the heat which such televisions generate.

Recently, proposals have been made to use DuPont's Cromalin® system to produce aperture masks. See, for example, Japanese Patent Publication No. 09-269546 and U.S. Pat. No. 5,870,224.

As discussed in these references, in the first step of the process, a laminate of (1) a tacky, photosensitive, transparent layer and (2) a lenticular lens array is prepared. Thereafter, the photosensitive layer is exposed with UV light through the lens array. The UV light causes the photosensitive layer to polymerize and lose its tackiness in the exposed regions. A backing film carrying toner particles is then applied to the photosensitive layer and through the application of pressure (e.g., pressure up to 700 kg/cm$^2$), toner particles are transferred to the unexposed and thus still tacky regions of the photosensitive layer. The backing film is then mechanically pulled away from the photosensitive layer with toner particles remaining on the layer at the tacky regions.

As illustrated by the comparative example set forth below, the Cromalin® system has the serious drawback that it produces apertures of low definition, i.e., rather than having cross-sectional perimeters of the desired design shape, the apertures have ragged, uneven perimeters. Moreover, the Cromalin® system for producing aperture masks exhibits a high level of variability in the shapes of the apertures, both among the apertures of a given screen and between screens.

An additional problem with the Cromalin® system arises from the fact that the apertures are filled with polymerized material. Such material may vary from aperture to aperture in, for example, the degree of polymerization, which can produce uncontrollable variations in the optical path for light passing through the finished screen. For example, the surface curvature of the polymerized material filling the apertures can vary in an uncontrollable manner from aperture to aperture.

Further variability in masks produced using the Cromalin® system can result from different amounts of toner being transferred to the regions of the mask which are intended to block visible light.

A further problem with the Cromalin® system arises from the fact that the high pressures used in the toner transfer step can damage the lens array portion of the laminate.

The present invention is designed to overcome these problems with the Cromalin® system.

SUMMARY OF THE INVENTION

In view of the foregoing, there is a need in the art for a self-aligned aperture mask having some and preferably all of the following properties:

(1) the mask comprises apertures of high definition;
(2) the mask is produced by a process with low variability both for the apertures of an individual mask and between masks in terms of aperture configuration and optical properties;
(3) the mask is produced by a process which produces essentially the same level of blackness at all parts of the mask which are intended to block light;
(4) the mask is produced by a process which does not apply excessive pressure to a lens array used to produce the self-aligned apertures;
(5) the mask does not substantially deteriorate with age; and
(6) the mask can be produced economically on a continuous basis.

The present invention provides self-aligned aperture masks which have some and preferably all of the foregoing six properties.

In accordance with one of its aspects, the invention provides a method for making an aperture mask for a screen comprising:

(a) providing a substrate having a first side and a second side, the first side having an array of lenses associated therewith;

(b) applying a positive-acting photoresist to the second side of the substrate, said photoresist comprising at least one pigment dispersed in a photosensitive matrix which, upon exposure to actinic radiation, becomes soluble in a developer solution, said at least one pigment absorbing light in the visible range;

(c) exposing the positive-acting photoresist by passing actinic radiation through the array of lenses to form an exposure pattern in the photoresist, said exposure pattern being a function of the optical properties of the lenses; and (d) developing the positive-acting photoresist using the developer solution to remove photoresist which has been exposed to the actinic radiation and thus form apertures in the photoresist which will transmit visible light to a greater extent than regions of the photoresist that have not been exposed to the actinic radiation.

In accordance with another of its aspects, the invention provides apparatus (a screen subassembly) comprising:

(a) a substrate having a first side and a second side;

(b) an array of lenses associated with the first side of the substrate; and (c) an aperture mask on the second side of the substrate comprising:

(i) a pigmented polymer layer comprising at least one pigment dispersed substantially uniformly throughout the layer, said pigment absorbing visible light, said pigmented polymer layer being either an unexposed positive-acting photoresist or an exposed, but not developed, positive-acting photoresist; and (ii) a plurality of apertures which pass through the pigmented polymer layer, the locations of the apertures being based on the optical properties of the array of lenses; wherein the apertures transmit visible light to a greater extent than the pigmented polymer layer.

As used herein, the term positive-acting photoresist means a photoresist having the characteristic that development of the photoresist causes removal from the photoresist of those portions of the photoresist that have been exposed to actinic radiation.

Additional features and advantages of the invention are set forth in the detailed description which follows, and in part will be readily apparent to those skilled in the art from that description or recognized by practicing the invention as described herein.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings illustrate various embodiments of the invention, and together with the description serve to explain the principles and operation of the invention. The drawings are not intended to indicate scale or relative proportions of the elements shown therein.

Figure 1A:
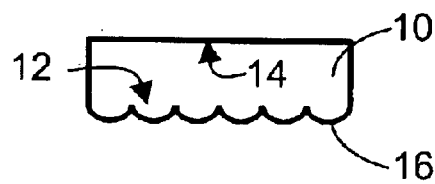
FIGS. 1A through 1E are schematic diagrams which illustrate the basic steps of the process of the invention.

The reference numbers used in the drawings correspond to the following:

10 substrate
12 first side of substrate
14 second side of substrate
16 lenses
18 positive-acting photoresist
20 base carrier sheet or film
22 release layer
24 pigmented photosensitive layer, i.e., photosensitive matrix having at least one pigment dispersed therein
26 non-pigmented photosensitive layer, i.e., photosensitive matrix per se
28 adhesive layer
29 actinic radiation
30 aperture
32 feed roll for lens array
34 feed roll for positive-acting photoresist
36 assembly station
38 peeling station
40 initial UV exposure station
42 development station
44 development solution application and brushing substation 46 rinsing substation
48 drying substation
50 final UV exposure station
52 protective coating station

DETAILED DESCRIPTION OF THE INVENTION

FIG. 1 illustrates the basic steps of the process of the invention. In particular, FIG. 1A shows a substrate 10 having a first side 12 and a second side 14, the first side having associated therewith an array of lenses 16.

The substrate can be composed of various materials known in the art such as polycarbonate, polyester, etc. The lenses 16 can be cylindrical lenses or microlenses, microlenses being preferred. In either case, the lenses can have a variety of configurations, preferred configurations being those disclosed in the above-referenced '033 patent application.

The lenses can be formed separately and applied to the first side of the substrate using, for example, a suitable adhesive. Alternatively, the lenses can be formed onto the first side using a molding process. See, for example, U.S. Pat. No. 5,264,063.

As a further alternative, the lenses can be formed directly in the first side of the substrate using an embossing process. In this case, the substrate preferably includes first and second layers, the first layer being relatively soft at room temperature so that it can be easily embossed. Further, once embossed, the first layer should be hardenable, e.g., through UV, e-beam, or thermal curing. For example, an acrylic-based resin which is UV curable can be used for the first layer.

Direct embossing without the use of a separate soft layer can also be used if the lenses have relatively low heights, e.g., if the lens effect is achieved through holography.

As a still further alternative, the substrate and the array of lenses can be formed simultaneously using a web extrusion process. See, for example, U.S. Pat. Nos. 4,601,861 and 4,486,363.

Figure 1B:
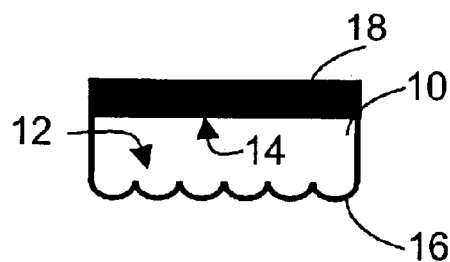

However obtained, the substrate with its associated lenses is then combined with a positive-acting photoresist 18 (see FIG. 1B).

Figure 2A:
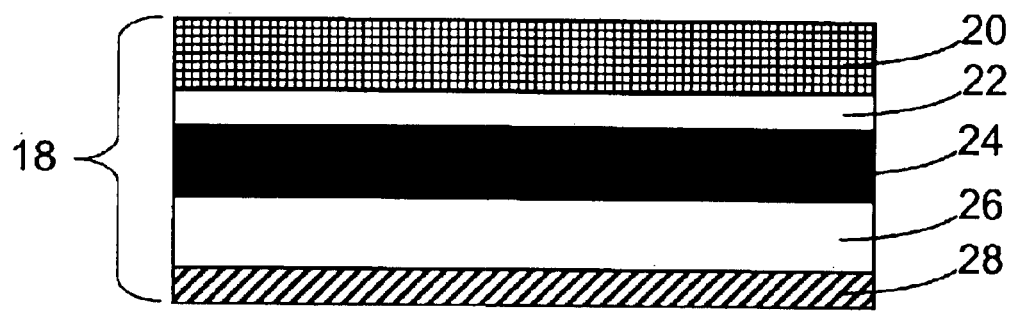
FIG. 2A is a schematic diagram illustrating a representative structure for a positive-acting photoresist suitable for use with the present invention prior to exposure to actinic radiation.

FIG. 2A shows a representative structure for photoresist 18 prior to exposure to actinic radiation. As shown therein, the photoresist can include a base carrier sheet or film 20, a release layer 22, a layer 24 comprising a photosensitive matrix and at least one pigment (e.g., carbon black having a mean particle size of less than 500 nanometers, preferably, 300 nanometers or less) dispersed substantially uniformly throughout the matrix, a layer 26 comprising a non-pigmented photosensitive matrix, and a thermal adhesive layer 28. The photosensitive matrix is preferably the reaction product of a resin with a diazo oxide.

Detailed descriptions of suitable photoresists 18 having the foregoing structure can be found in, for example, U.S. Pat. No. 4,260,673, the contents of which is incorporated herein by reference. Commercially, such photoresists are available from Imation Inc., Oakdale, Minn., and are sold under the trademark MATCHPRINT. Particularly suitable MATCHPRINT products for use in the process of the present invention are those referred to as "black U.S. standard" and "black Euro standard." Other configurations for photoresist 18 can be used in the practice of the invention. For example, non-pigmented layer 26 can be removed if desired. Also, the content of black pigment can be made higher than that used in the U.S. and Euro standard products, if desired. Alternatively, an enhanced optical density can be achieved by increasing the thickness of pigmented layer 24.

Photoresist 18 can be applied to second side 14 of substrate 10 in a variety of ways. Preferably, thermal adhesive layer 28 of the commercially available MATCHPRINT product is used for this purpose. Alternatively, a pressure sensitive adhesive can be employed either alone or in combination with a thermal adhesive.

Figure 1C:
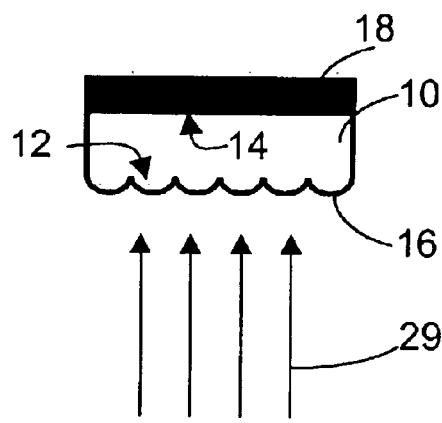

As shown in FIG. 1C, the photoresist/substrate/lens array assembly, however prepared, is exposed to actinic radiation 29 through lenses 16 to produce an exposure pattern of exposed and non-exposed regions in the positive-acting photoresist. Exposure through the lenses produces the desired self-alignment of the aperture mask with the lenses.

Various types of actinic radiation can be used to perform the exposure depending on the characteristics of the positive-acting photoresist. Examples include UV radiation, IR radiation, and visible light, UV radiation being preferred. In particular, UV radiation having a wavelength in the range of 360–410 nanometers is preferred when the positive-acting photoresist is the MATCHPRINT product discussed above.

The exposure with actinic radiation should have a spatial distribution which corresponds to the spatial distribution of visible light which will pass through the lenses during use of the finished rear projection screen. In particular, the actinic radiation needs to be spatially distributed by the lenses of the lens array in a manner which is similar to the manner in which visible light will be distributed by those lenses during use of the finished screen. This needs to take into account the variation of the index of refraction of the lenses with wavelength as well as the wavelength range of the actinic radiation and of the visible light which will be passing through the screen during use. The configuration of the incoming actinic radiation beam is adjusted to achieve this desired correspondence of spatial distributions. Commercially available optical design programs can be used to determine lens systems which will cause the actinic radiation to have the desired spatial distribution.

Figure 1D:
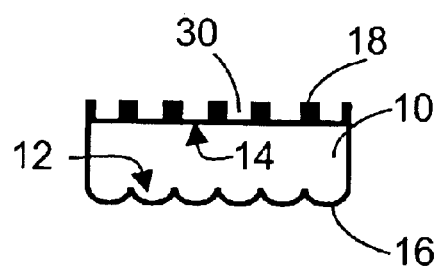

After UV exposure, the photoresist/substrate/lens array assembly is developed to remove the regions of the photosensitive matrix (both pigmented and non-pigmented in FIG. 2) which have been exposed to the actinic radiation and thus form the desired self-aligned apertures (see FIG. 1D). A variety of developer solutions can be used depending on the particular photoresist employed, water-based developers being preferred because of their ease of handling and disposal. For the MATCHPRINT system discussed above, the developer has a pH of 9 or higher so that it can dissolve the exposed regions of the photosensitive matrix. This developer also dissolves release layer 22 so that the developer solution can reach photosensitive layers 24 and 26.

Figure 2B:
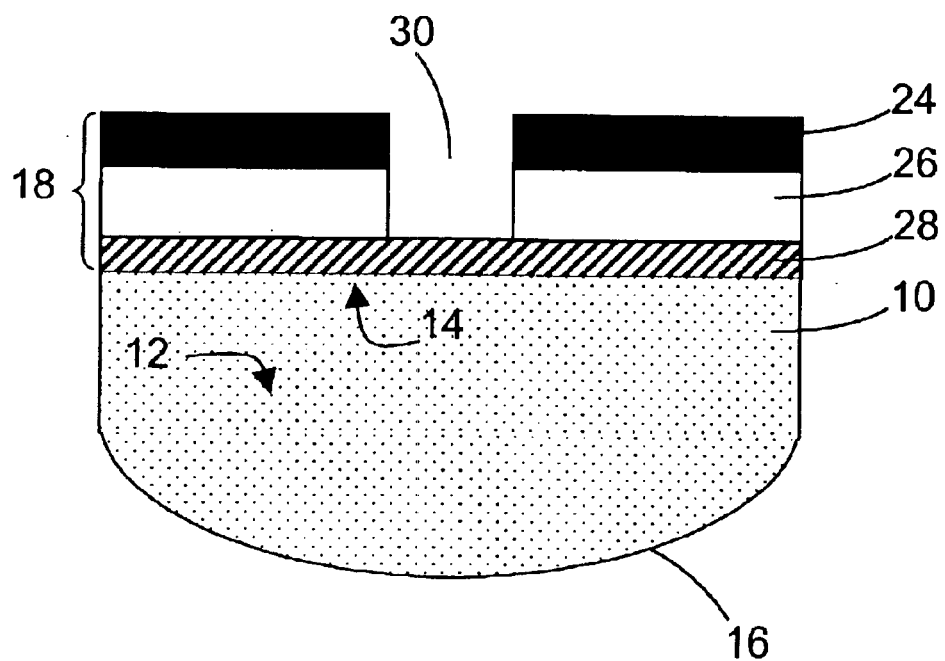
FIG. 2B shows the same structure as FIG. 2A after (1) lamination of photoresist 18 to the second side of substrate 10, (2) removal of carrier sheet 20, and (3) actinic radiation exposure and development. Only one aperture 30 is shown in this figure, it being understood that in practice a plurality of apertures will be formed in the photoresist.

The developer solution is applied to release layer 22 and a mild brushing is used to help remove the exposed regions of the photoresist. Thereafter, excess developer and dissolved photosensitive resin is washed from the surface using water, following which the developed photoresist/substrate/lens array assembly is passed through low pressure rollers to squeeze off remaining liquid. Finally, the assembly is dried using, for example, hot air. FIG. 2B shows the structure of the photoresist/substrate combination at this stage of the process.

Figure 1E:
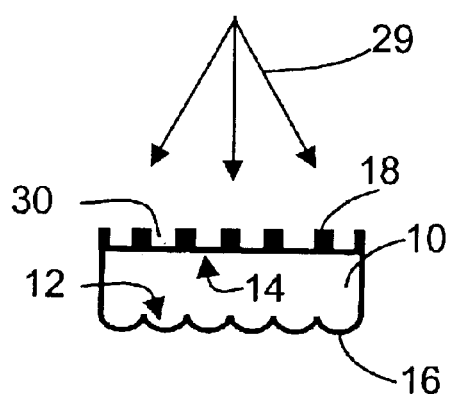

To stabilize the color of the assembly, a second exposure with actinic radiation is performed as shown in FIG. 1E. Since the development process has been completed at this point in the process, this exposure does not result in a change in the configuration of the photoresist, i.e., the photoresist continues to have the self-aligned apertures surrounded by a resin matrix.

To protect the finished photoresist/substrate/lens array assembly, a plastic protective layer, e.g., a thermoplastic acrylic layer, can be applied to the finished assembly. Alternatively, the assembly can be mounted to a support sheet, e.g., a sheet of polycarbonate or PMMA, using an appropriate adhesive.

Figure 3:
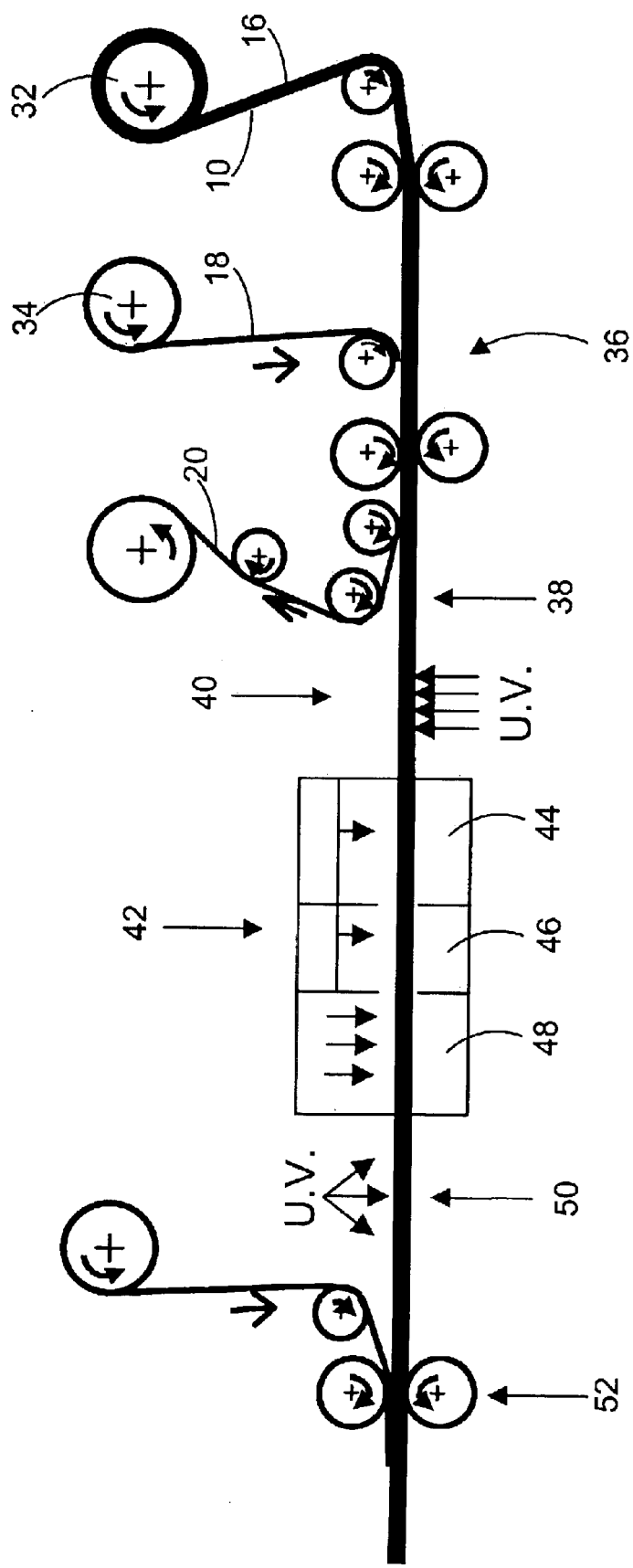
FIG. 3 is a schematic diagram illustrating a representative continuous production embodiment of the invention.

FIG. 3 shows a representative continuous process for practicing the steps of FIG. 1. As shown therein, feed roll 32 provides substrate 10 with preformed arrays of lenses 16 and feed roll 34 provides unexposed photoresist 18. The substrate and photoresist are combined together at assembly station 36, and layer 20 of FIG. 2A is removed at peeling station 38. Assembly station 36 includes an appropriate heating system (not shown) to activate the thermal adhesive of layer 28.

The photoresist is exposed with the desired aperture pattern at initial UV exposure station 40. If desired, station 40 can be located upstream of peeling station 38 since the UV exposure takes place through the array of lenses. In either case, the exposed photoresist is developed in development station 42 which includes substations 44, 46, and 48 for development solution application and brushing, rinsing, and drying, respectively.

The developed photoresist then passes through final UV exposure station 50 which exposes the remaining photoresist and thus stabilizes the color of the aperture mask. Finally, a protective layer is applied at station 52. Alternatively, a support sheet can be applied at this point in the process as discussed above.

For a flexible protective layer, the finished photoresist/substrate/lens array assembly can be collected on a roll for later use in constructing a finished rear projection screen. If a support sheet is used for protection, the finished assembly can be cut and stacked for later use. Alternatively, in either case, further processing can take place immediately after the application of the protective layer or sheet.

COMPARATIVE EXAMPLE

Figure 4A:
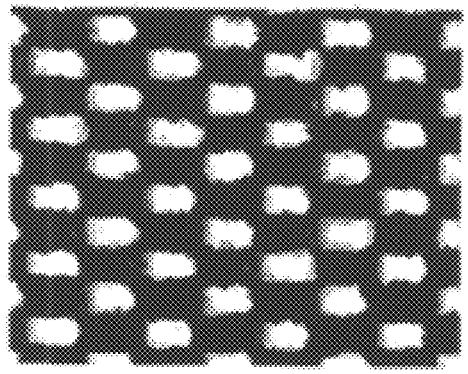
FIGS. 4A and 4B are photomicrographs of portions of aperture masks prepared using the process of the present invention and the Cromalin® process, respectively, at a magnification of 20×. The aperture dimensions are approximately 40 microns by 20 microns in each case.
Figure 4B:
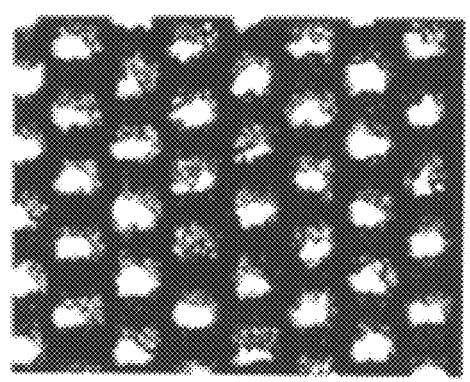
Figure 6:
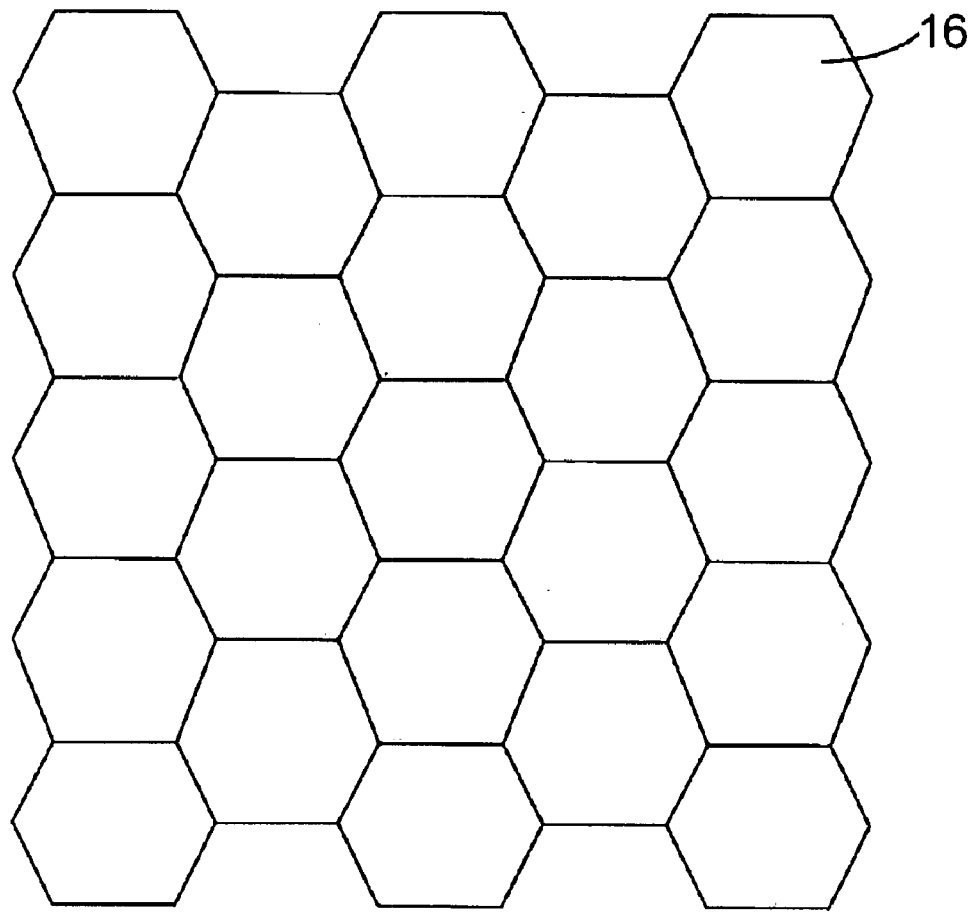
FIG. 6 shows the layout of the microlens array through which UV light was passed to produce the aperture masks of FIGS. 4 and 5.

FIGS. 4A and 4B are photomicrographs of portions of aperture masks prepared using the process of the present invention and the Cromalin® process, respectively, at a magnification of 20×. FIG. 6 shows the layout of the microlens array through which UV light was passed to produce the aperture masks of this figure.

The individual microlenses were anamorphic microlenses having a diameter of 50 microns and a center-to-center spacing of 43.3 microns. The lenses had parabolic profiles along both their fast (horizontal) and slow (vertical) axes. The microlenses were randomized in accordance with the above-referenced '033 patent application. In particular, the radius of curvature along the fast axis was chosen to be between 8 and 9 microns with a uniform probability density function, while for the slow axis, the radius of curvature was chosen to be between 33 and 36 microns, again with a uniform probability density function. The total depth of the microlenses was 36 microns.

The thickness of the substrate which carried the microlenses was chosen to place the photosensitive layer in each case between the fast axis and slow axis focal planes of the microlenses. In particular, the thickness was chosen so that the photosensitive layer was approximately at the location of the circles of least confusion of the microlenses. This location minimized the spot sizes of the UV light used to expose the photosensitive layer. For the above microlenses, the distance between the apices of the microlenses and the photosensitive layer was approximately 75 microns.

The masks of FIGS. 4A and 4B were prepared by passing collimated UV light through the microlenses with the collimation angle and other exposure conditions being the same in each case except for exposure time which was separately optimized for the two photosensitive materials. Other than the use of collimated light, the Cromalin® and MATCHPRINT photosensitive materials were used in accordance with the respective manufacturer's instructions.

As can be seen in FIG. 4, the process of the present invention produced significantly better apertures than those produced by the Cromalin® process. In particular, the apertures of the invention have substantially better definition than those of the Cromalin® process. Also, the variation between apertures is substantially less for the process of the invention than for the Cromalin® process. A high level of variation from run to run was also seen with the Cromalin® process, while the process of the invention produced essentially identical apertures each time it was performed.

Analyses were performed to quantify the differences between the apertures of FIGS. 4A and 4B and, in particular, the differences in aperture variability between the two figures. The procedures used were as follows.

Each image constituted 640×512 pixels representing a sample size of 700 $\mu$m×560 $\mu$m. Each pixel corresponded to 1.09375 $\mu$m×1.09375 $\mu$m. In order to perform the calculations, the original images (FIGS. 4A and 4B) were transformed to binary (black and white) pictures (FIGS. 7A and 7B) by applying a threshold. The threshold used was 128 in a range of 0 to 255 gray steps. The internal perimeters of the apertures were then extracted to produce FIGS. 8A and 8B.

Figure 7A:
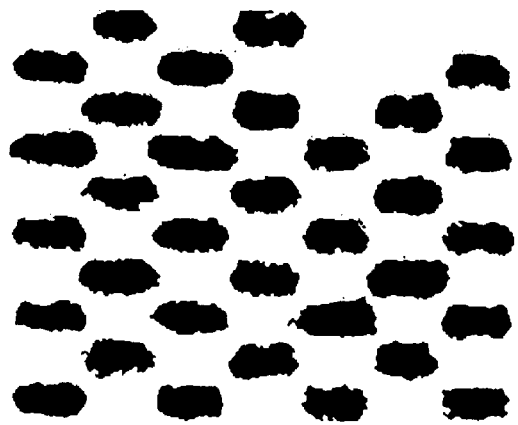
FIGS. 7A and 7B are binary (black and white) pictures showing the apertures of FIGS. 4A and 4B, respectively, except for the merged aperture at (row 1—column 6) and (row 2—column 5) of FIG. 4A, which was not included in the quantitative analysis.
Figure 7B:
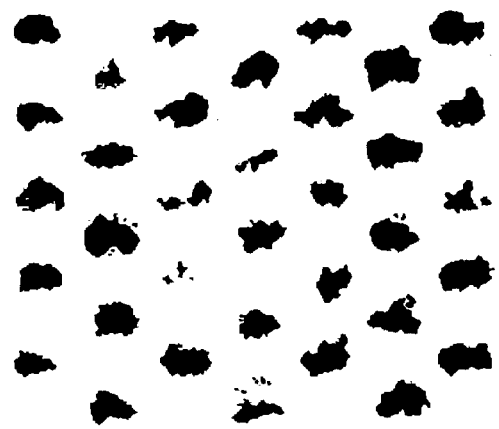
Figure 8A:
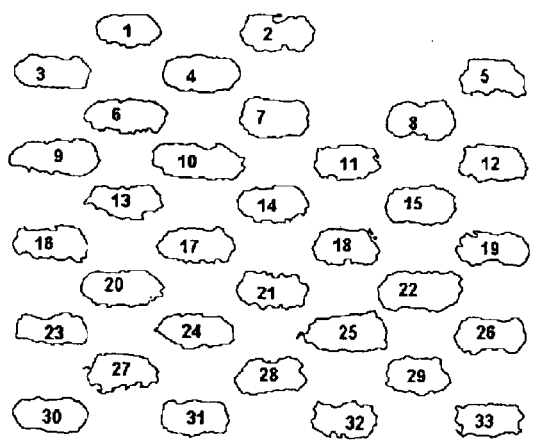
FIGS. 8A and 8B show the perimeters of the apertures of FIGS. 7A and 7B, respectively, These figures also include the aperture numbers of Tables 1A and 1B.
Figure 8B:

The area (in pixels) and perimeter (in pixels) of each aperture was measured from FIGS. 7A and 7B by counting the black pixels in each domain. Some apertures of FIG. 7B are composed of sub-apertures which were grouped together and considered as a single aperture in the analysis.

The software used for the threshold and pixel counting was NIH IMAGE (version 1.62) by Wayne Rasband, National Institutes of Health, USA.

The "circularity" of each aperture (a unitless number) was calculated as follows:

$$\text{circularity}=(\text{perimeter})^2/(4\pi(\text{area})).$$

The fractal dimension of each aperture was calculated using the Mass Radius Method and the on-line software FRACTOP V0.2, available at http://life.csu.edu.au/fractop/. The following parameters were used in the analysis:

(a) number of centers to average over: 20;
(b) number of regression points to use for the semi-log graph regression: 10;
(c) centers limited within 0.3 times radius of gyration.

The results of the analysis are shown in Tables 1A and 1B for the apertures of the present invention (MATCHPRINT) and the prior art (Cromalin®), respectively. As can be seen in these tables, the area, perimeter, circularity and fractal dimension dispersions (i.e., standard deviation divided by mean) are lower for the apertures of the present invention than for the apertures of the prior art. Put another way, the data of Tables 1A and 1B show that for a given microlens design, the process of the invention leads to apertures with a higher level of homogeneity in size and shape than the prior art process.

It should be noted that the apertures of FIGS. 4A and 4B were formed using microlenses which were intentionally random in shape, i.e., the microlenses varied in radius of curvature. Such randomness automatically results in at least some variation in the apertures formed. For this reason, absolute dispersion values are not appropriate for distinguishing the apertures of the present invention from those produced by the prior art. For example, the apertures produced by the prior art method for a set of uniform (non-random) microlenses could exhibit less dispersion than the apertures produced by the present invention for a set of random microlenses.

Relative values however can be determined. Thus, the ratio of the dispersion values of Tables 1A to the dispersion values of Table 1B for area, perimeter, circularity, and fractal dimension are 0.35, 0.47, 0.37, and 0.46, respectively. Thus, in general, the level of inter-aperture variability of the apertures of the invention will be less than 50% of the level of inter-aperture variability of the apertures of the prior art for a comparable set of microlenses.

Figure 5A:
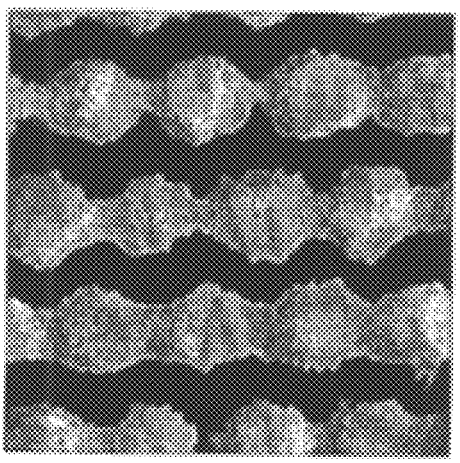
FIGS. 5A and 5B are photomicrographs of portions of aperture masks prepared using the process of the present invention and the Cromalin® process, respectively, at a magnification of 50×. The maximum short-axis aperture dimension is approximately 30 microns in each case.
Figure 5B:
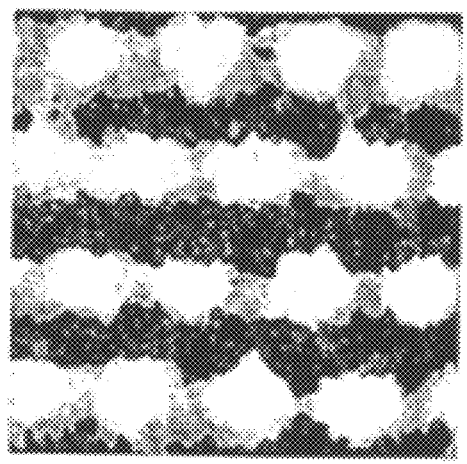

FIGS. 5A and 5B show a second set of self-aligned aperture masks prepared using the same microlens array layout of FIG. 6, the same microlens diameter of 50 microns, and the same center-to-center spacing of 43.3 microns. The lenses had parabolic profiles along their slow axes with the radius of curvature being chosen to be between 16 and 26 microns with a uniform probability function.

Along the fast axis, hybrid spherical/parabolic profiles described by the following sag function, were used:

$$s(x) = \alpha\left(R_s - \sqrt{R_s^2 - x^2}\right) + \frac{x^2}{2R_p},$$

where $\alpha$, $R_s$, and $R_p$ are the adjustable parameters of the profile. For the microlenses used to produce FIG. 5, $R_s$ was 25 microns, $R_p$ was chosen to be between 8 and 14 microns with a uniform probability function, and $\alpha$ was chosen to be between 0.6 and 0.8, again with a uniform probability function. The total microlens depth was 43 microns.

For these microlenses, the distance between the apices of the microlenses and the photosensitive layer was approximately 80–85 microns which caused the apertures to overlap so that the finished aperture mask, as shown in FIG. 5, is in the form of black serpentine strips. The exposure protocol was the same as that used for FIG. 4. Again, as in FIG. 4, the process of the present invention produced superior apertures to those produced by the Cromalin® process.

Rather than placing the photosensitive layer at the circle of least confusion as was done in preparing FIGS. 4 and 5, the photosensitive layer can be placed at either the fast axis or the slow axis focal plane. This location has the advantage of increasing the area of the aperture mask which is light blocking without unacceptably reducing the amount of light which passes through the screen to the viewer during use of the projection television.

For this case, when randomized microlenses are used, the randomization should be constrained so that all of the microlenses have a substantially common fast or slow focal plane. For example, for a hybrid spherical/parabolic profile of the type described by the equation set forth above, the randomization preferably is performed so that the following relationship is satisfied:

$$\frac{R_p R_s}{\alpha R_p + R_s} = \left(1 - \frac{1}{2n_{UV}} - \frac{1}{2n_{\max}}\right)\tau,$$

where $\tau$ is the thickness of the substrate, $n_{uv}$ is the index of refraction of the microlenses and the substrate during UV exposure (the indices of refraction of the microlenses and the substrate are preferably equal to avoid surface losses), and $n_{max}$ is the effective index of refraction of the portions of the screen upstream of the aperture mask (i.e., towards the light source) for the longest wavelength of light that will pass through the screen during use.

Although specific embodiments of the invention have been described and illustrated, it will be apparent to those skilled in the art that modifications and variations can be made without departing from the invention's spirit and scope. The following claims are thus intended to cover the specific embodiments set forth herein as well as such modifications, variations, and equivalents.

TABLE 1A

| | Present Invention | | | |
| --- | --- | --- | --- | --- |
| Aperture # | Area (pixel) | Perimeter (pixel) | Circularity (unitless) | Fractal dimension |
| 1 | 2224 | 239 | 2.04 | 1.88 |
| 2 | 2916 | 320 | 2.79 | 1.85 |
| 3 | 2756 | 276 | 2.20 | 1.82 |
| 4 | 3044 | 276 | 1.99 | 1.83 |
| 5 | 2460 | 269 | 2.34 | 1.84 |
| 6 | 2907 | 327 | 2.93 | 1.78 |
| 7 | 2986 | 263 | 1.84 | 1.94 |
| 8 | 2787 | 290 | 2.40 | 1.89 |
| 9 | 3318 | 322 | 2.49 | 1.73 |
| 10 | 3451 | 324 | 2.42 | 1.74 |
| 11 | 2425 | 273 | 2.45 | 1.88 |
| 12 | 2631 | 262 | 2.08 | 1.9 |
| 13 | 2524 | 287 | 2.60 | 1.75 |
| 14 | 2740 | 281 | 2.29 | 1.87 |
| 15 | 2994 | 270 | 1.94 | 1.91 |
| 16 | 2712 | 299 | 2.62 | 1.8 |
| 17 | 2838 | 291 | 2.37 | 1.82 |
| 18 | 2567 | 292 | 2.64 | 1.9 |
| 19 | 2595 | 301 | 2.78 | 1.82 |
| 20 | 3190 | 302 | 2.28 | 1.81 |
| 21 | 2724 | 299 | 2.61 | 1.87 |
| 22 | 3699 | 317 | 2.16 | 1.83 |
| 23 | 2364 | 268 | 2.42 | 1.78 |
| 24 | 2633 | 275 | 2.29 | 1.76 |
| 25 | 3393 | 328 | 2.52 | 1.71 |
| 26 | 2715 | 273 | 2.18 | 1.86 |
| 27 | 2700 | 334 | 3.29 | 1.84 |
| 28 | 2675 | 289 | 2.48 | 1.84 |
| 29 | 2576 | 261 | 2.10 | 1.88 |
| 30 | 2811 | 267 | 2.02 | 1.83 |
| 31 | 2604 | 250 | 1.91 | 1.88 |
| 32 | 2464 | 292 | 2.75 | 1.9 |
| 33 | 2447 | 290 | 2.73 | 1.85 |
| Total | 91870 | 9507 | | |
| Mean | 2783.94 | 288.09 | 2.39 | 1.84 |
| Std Dev | 332.56 | 24.09 | 0.33 | 0.06 |
| Std Dev/Mean | 0.119 | 0.084 | 0.136 | 0.031 |

TABLE 1B

Prior Art

| Aperture # | Area (pixel) | Perimeter (pixel) | Circularity (unitless) | Fractal dimension |
|---|---|---|---|---|
| 1 | 1374 | 180 | 1.88 | 1.91 |
| 2 | 915 | 189 | 3.11 | 1.76 |
| 3 | 1039 | 222 | 3.77 | 1.66 |
| 4 | 1717 | 227 | 2.39 | 1.85 |
| 5 | 618 | 189 | 4.60 | 1.94 |
| 6 | 1542 | 219 | 2.48 | 1.88 |
| 7 | 2321 | 268 | 2.46 | 1.95 |
| 8 | 1128 | 191 | 2.57 | 1.82 |
| 9 | 1577 | 218 | 2.40 | 1.78 |
| 10 | 1589 | 265 | 3.52 | 1.79 |
| 11 | 1650 | 233 | 2.62 | 1.93 |
| 12 | 1300 | 213 | 2.78 | 1.81 |
| 13 | 555 | 184 | 4.85 | 1.57 |
| 14 | 1906 | 236 | 2.33 | 1.87 |
| 15 | 1428 | 240 | 3.21 | 1.89 |
| 16 | 788 | 228 | 5.25 | 1.85 |
| 17 | 972 | 172 | 2.42 | 2 |
| 18 | 907 | 226 | 4.48 | 1.66 |
| 19 | 2201 | 314 | 3.56 | 1.93 |
| 20 | 1294 | 218 | 2.92 | 1.86 |
| 21 | 1539 | 240 | 2.98 | 1.88 |
| 22 | 1291 | 182 | 2.04 | 1.93 |
| 23 | 198 | 118 | 5.60 | 2.3 |
| 24 | 1091 | 185 | 2.50 | 1.92 |
| 25 | 1785 | 251 | 2.81 | 1.89 |
| 26 | 1627 | 219 | 2.35 | 1.98 |
| 27 | 1116 | 201 | 2.88 | 1.91 |
| 28 | 1650 | 293 | 4.14 | 1.83 |
| 29 | 894 | 173 | 2.66 | 1.78 |
| 30 | 1547 | 246 | 3.11 | 1.9 |
| 31 | 1578 | 246 | 3.05 | 1.84 |
| 32 | 1634 | 227 | 2.51 | 1.86 |
| 33 | 1275 | 209 | 2.73 | 1.79 |
| 34 | 969 | 304 | 7.59 | 1.62 |
| 35 | 1788 | 251 | 2.80 | 1.89 |
| Total | 46803 | 7777 | | |
| Mean | 1337.23 | 222.20 | 3.24 | 1.86 |
| Std Dev | 456.24 | 39.80 | 1.18 | 0.12 |
| Std Dev/Mean | 0.341 | 0.179 | 0.365 | 0.067 |

What is claimed is:

1. A method for making an aperture mask for a screen comprising:
   (a) providing a substrate having a first side and a second side, the first side having an array of lenses associated therewith;
   (b) applying a positive-acting photoresist to the second side of the substrate using an adhesive, said photoresist comprising a pigmented layer composed of at least one pigment dispersed in a photosensitive matrix which, upon exposure to actinic radiation, becomes soluble in a developer solution, said at least one pigment absorbing light in the visible range;
   (c) exposing the positive-acting photoresist by passing actinic radiation through the array of lenses to form an exposure pattern in the positive-acting photoresist, said exposure pattern being a function of the optical properties of the lenses; and
   (d) developing the positive-acting photoresist using the developer solution to remove photoresist which has been exposed to the actinic radiation and thus form apertures in the photoresist which will transmit visible light to a greater extent than regions of the photoresist that have not been exposed to the actinic radiation.

2. The method of claim 1 wherein the photosensitive matrix comprises the reaction product of a resin and a diazo oxide.

3. The method of claim 1 wherein the apertures have a low level of inter-aperture variability.

4. A method for making an aperture mask for a screen comprising:
   (a) providing a substrate having a first side and a second side, the first side having an array of lenses associated therewith;
   (b) applying a positive-acting photoresist to the second side of the substrate, said photoresist comprising:
      (i) a non-pigmented layer composed of a photosensitive matrix which upon exposure to actinic radiation, becomes soluble in a developer solution; and
      (ii) a pigmented layer composed of at least one pigment dispersed in a photosensitive matrix which, upon exposure to actinic radiation, becomes soluble in the developer solution, said at least one pigment absorbing light in the visible range, said non-pigmented layer being closer to the second side of the substrate than the pigmented layer;
   (c) exposing the positive-acting photoresist by passing actinic radiation through the array of lenses to form an exposure pattern in the positive-acting photoresist, said exposure pattern being a function of the optical properties of the lenses; and
   (d) developing the positive-acting photoresist using the developer solution to remove photoresist which has been exposed to the actinic radiation and thus form apertures in the photoresist which will transmit visible light to a greater extent than regions of the photoresist that have not been exposed to the actinic radiation.

5. The method of claim 4 wherein the photosensitive matrices of the pigmented and non-pigmented layers comprise the reaction product of a resin and a diazo oxide.

6. The method of claim 4 wherein the apertures have a low level of inter-aperture variability.

7. The method of claim 4 wherein the positive-acting photoresist is applied to the second side of the substrate using an adhesive.

8. The method of claim 7 wherein the photosensitive matrix comprises the reaction product of a resin and a diazo oxide.

9. The method of claim 7 wherein the apertures have a low level of inter-aperture variability.

10. Apparatus comprising:
    (a) a substrate having a first side and a second side;
    (b) an array of lenses associated with the first side of the substrate; and
    (c) an aperture mask on the second side of the substrate comprising:
       (i) a pigmented polymer layer comprising at least one pigment dispersed substantially uniformly throughout the layer, said pigment absorbing visible light, said pigmented polymer layer being either an unexposed positive-acting photoresist or an exposed, but not developed, positive-acting photoresist;
       (ii) an adhesive layer between the pigmented polymer layer and the second side of the substrate; and
       (iii) a plurality of apertures which pass through the pigmented polymer layer, the locations of the apertures being based on the optical properties of the array of lenses;
    wherein the apertures transmit visible light to a greater extent than the pigmented polymer layer.

11. The apparatus of claim 10 wherein the pigmented polymer layer comprises the reaction product of a resin and a diazo oxide.

12. The apparatus of claim 10 wherein the apertures have a low level of inter-aperture variability.

13. A rear projection television comprising the apparatus of claim 10.

14. Apparatus comprising:
   (a) a substrate having a first side and a second side;
   (b) an array of lenses associated with the first side of the substrate; and
   (c) an aperture mask on the second side of the substrate comprising:
      (i) a pigmented polymer layer comprising at least one pigment dispersed substantially uniformly throughout the layer, said pigment absorbing visible light, said pigmented polymer layer being either an unexposed positive-acting photoresist or an exposed, but not developed, positive-acting photoresist;
      (ii) a non-pigmented polymer layer which is either an unexposed positive-acting photoresist or an exposed, but not developed, positive-acting photoresist, said non-pigmented polymer layer being closer to the second side of the substrate than the pigmented polymer layer; and
      (iii) a plurality of apertures which pass through the pigmented polymer layer, the locations of the apertures being based on the optical properties of the array of lenses;

wherein the apertures transmit visible light to a greater extent than the pigmented polymer layer.

15. The apparatus of claim 14 wherein the pigmented and non-pigmented polymer layers comprise the reaction product of a resin and a diazo oxide.

16. The apparatus of claim 14 wherein the apertures have a low level of inter-aperture variability.

17. A rear projection television comprising the apparatus of claim 14.

18. The apparatus of claim 14 further comprising an adhesive layer between the non-pigmented polymer layer and the second side of the substrate.

19. The apparatus of claim 18 wherein the pigmented and non-pigmented polymer layers comprise the reaction product of a resin and a diazo oxide.

20. The apparatus of claim 18 wherein the apertures have a low level of inter-aperture variability.

21. A rear projection television comprising the apparatus of claim 18.

* * * * *

UNITED STATES PATENT AND TRADEMARK OFFICE
CERTIFICATE OF CORRECTION

PATENT NO. : 6,770,425 B2
DATED : August 3, 2004
INVENTOR(S) : Michael Brady et al.

It is certified that error appears in the above-identified patent and that said Letters Patent is hereby corrected as shown below:

Title page
Item [56], References Cited, U.S. PATENT DOCUEMNTS,
"2,362,573 A   1/1944  MacNeille" should say -- 2,362,573 A   11/1944   MacNeille --

Signed and Sealed this

Tenth Day of May, 2005

JON W. DUDAS
*Director of the United States Patent and Trademark Office*